(12) United States Patent
Yaniv et al.

(10) Patent No.: US 8,768,966 B2
(45) Date of Patent: Jul. 1, 2014

(54) METHOD FOR MANAGING SIMULTANEOUS MODIFICATION OF DATABASE OBJECTS DURING DEVELOPMENT

(75) Inventors: Yehuda Yaniv, Herzliya (IL); Roy Ozeri, Tel Aviv (IL)

(73) Assignee: DB Maestro Ltd., Petach Tikva (IL)

( * ) Notice: Subject to any disclaimer, the term of this patent is extended or adjusted under 35 U.S.C. 154(b) by 740 days.

(21) Appl. No.: 12/439,137

(22) PCT Filed: Sep. 3, 2007
(Under 37 CFR 1.47)

(86) PCT No.: PCT/IL2007/001085
§ 371 (c)(1),
(2), (4) Date: Dec. 22, 2009

(87) PCT Pub. No.: WO2008/029393
PCT Pub. Date: Mar. 13, 2008

(65) Prior Publication Data
US 2010/0114967 A1    May 6, 2010

(30) Foreign Application Priority Data

Sep. 4, 2006  (IL) .......................................... 177878
Nov. 23, 2006 (IL) .......................................... 179535

(51) Int. Cl.
*G06F 17/30*    (2006.01)

(52) U.S. Cl.
USPC ........... 707/785; 707/781; 707/782; 707/783; 707/786

(58) Field of Classification Search
USPC .......................... 707/785, 781, 782, 783, 786
See application file for complete search history.

(56) References Cited

U.S. PATENT DOCUMENTS 5,448,727 A    9/1995  Annevelink
5,740,434 A    4/1998  Eastep (Continued)

FOREIGN PATENT DOCUMENTS

WO    2005022415 A1    3/2005

OTHER PUBLICATIONS

Lynn Langfeld et al., Microsoft® SharePoint™ 2003 Unleashed (2004), published by Sams, pp. 9, 31, 36-37, 47-48, 90,180, 276-78, 295, 357-58, 446, 461, 464, 466, 469-72, 496, 502, 526, 544-45, 577, 583.*

(Continued)

*Primary Examiner* — Hosain Alam
*Assistant Examiner* — Ahmed Abraham
(74) *Attorney, Agent, or Firm* — Marsteller & Associates, P.C.

(57)    ABSTRACT

The present invention relates to a method for preventing the simultaneous modification of the same database object in a shared database by more than one user during the database development stage comprising the steps of: (a) creating security roles for said users, wherein each of the security roles has a modification permission set for denying or granting at least one modification permission to at least one said database object; (b) assigning each of said security roles to each of said users; (c) providing means for said users to request said modification permission to said database object; (d) receiving said request from a first user for said modification permission to said at least one database object; (e) determining that said security roles of said users, excluding the security role of first user, are set to deny said modification permissions to said object; (f) updating said security role of said first user to grant said modification permission to said object; (g) allowing said first user to modify said object; (h) receiving a termination notification from said first user for concluding said modification permission to said object; and (i) updating said security role of said first user to cease said modification permission to said object.

2 Claims, 7 Drawing Sheets

(56) References Cited

U.S. PATENT DOCUMENTS

| | | | |
|---|---|---|---|
| 5,742,813 | A | 4/1998 | Kavanagh et al. |
| 7,401,085 | B2 * | 7/2008 | Mackay et al. ..................... 1/1 |
| 2005/0050105 | A1 * | 3/2005 | Idicula et al. ............... 707/200 |
| 2005/0165858 | A1 * | 7/2005 | Tom et al. .................. 707/201 |
| 2005/0203718 | A1 * | 9/2005 | Carek et al. ..................... 703/1 |
| 2006/0212496 | A1 | 9/2006 | Romine et al. |
| 2006/0282456 | A1 * | 12/2006 | Kapoor et al. ............... 707/102 |
| 2006/0293971 | A1 * | 12/2006 | Hunter et al. .................. 705/26 |
| 2007/0027815 | A1 * | 2/2007 | Sobel et al. .................... 705/59 |
| 2007/0043626 | A1 * | 2/2007 | Duvall et al. .................. 705/26 |
| 2007/0174281 | A1 * | 7/2007 | Chase .............................. 707/9 |
| 2007/0197261 | A1 * | 8/2007 | Humbel ....................... 455/558 |
| 2010/0287597 | A1 * | 11/2010 | Richins et al. .................... 726/1 |
| 2013/0086095 | A1 * | 4/2013 | Barton ......................... 707/758 |

OTHER PUBLICATIONS

Lynn Langfeld et al., Microsoft® SharePoint™ 2003 Unleashed (2004), published by Sams, pp. 9, 31, 36-37, 47-48, 90,180, 276-278, 295, 357-358, 446, 461, 464, 466, 469-472, 496, 502, 526, 544-545, 577, 583.*

Thomas Moore, MCSE SQL Server™ 2000 Database Design and Implementation (2002), published by Pearson Certification, pp. 7-8, 337, 348, 351, 353-354, 589, 560-561.*

Dinesh Asanka, DDL Triggers in SQL Server 2005 (Aug. 14, 2007), http://www.sql-server-performance.com/2007/ddl-triggers/.*

Lynn Langfeld et al., Microsoft@ SharePoint TM 2003 Unleashed (2004), published by Sams.*

Thomas Moore, MCSE SQL Server TM 2000 Database Design and Implementation (2002), published by Pearson Certification.*

Jeffrey Juday, Using DDL Triggers to Manage SQL Server 2005 (Sep. 28, 2005), http://www.developer.com/db/article.php/3552096/Using-DDL-Triggers-to-Manage-SQL-Server-2005.htm.*

Langfeld et al., Microsoft@ SharePoint TM 2003 Unleashed (2004).*

Thomas Moore, MCSE SQL Server TM 2000 Database Design and Implementation (2002).*

Jeffrey Juday, Using DOL Triggers to Manage Sal Server 2005.*

IPRP CH. I (PCT/IL2007/001085) Apr. 10, 2008.

ISR and Written Opinion of the ISA (PCT/IL2007/001085).

Juday J., "Using DDL triggers to manage SQL server 2005", Database Journal, [Online], Oct. 5, 2005, pp. 1-4, XP002473499, Internet, URL:http://www.databasejournal.com/news/article.php/3554006.

Juday J: "Using DDL triggers to manage SQL server 2005", www.developer.com [Online], Oct. 5, 2005, pp. 1-10, XP002473498, Internet URL: www.developer.com/db/article.php/35520 96.

Chapman Tim: "Audit-system mit SQL server 2005", Znet, [Online] Jun. 21, 2006, pp. 1-3, XP002473497, Internet URL: http://www.znet.de/builder/architect/0,39023548, 39145506, 00.htm> (for relevant passages, please see ISR submitted herewith).

Ramasubramanian P et al: "An active rule . . . constraints" IEEE Tencon 2003. Conf. on Convergent Technologies for the Asia-Pacific Region. Bangalore, India, Oct. 15-17, 2003, IEEE Region 10 Ann. Conf., NY,: IEEE, US vol. 4 of 4, conf.18, Oct. 15, 2003, pp. 1148-1152, XP010687444.

Database Security in Oracle8i . . . Nov. 1999, Internet citation, Nov. 30, 1999, XP002237310, URL:http://technet.oracle.com/deploy/security/pdf/oow99/dbswp86.pdf.

Holliday J et al: "Planned disconnections for mobile databases", Database and Expert Systems Applications, 2000, Proceedings. 11th Int'l Workshop, Sep. 4-8, 2000, Piscataway, NJ, pp. 165-169, XP010515490.

Hyun-Ju Park et al: "Implementation of checkout/ . . . systems", Database and Expert Systems Applications, 1996. Proceedings., 7th Int'l Workshop on Zurich, Sep. 9-10, 1996, Los Alamitos, CA, pp. 298-303, XP010200888.

* cited by examiner

METHOD FOR MANAGING SIMULTANEOUS MODIFICATION OF DATABASE OBJECTS DURING DEVELOPMENT

FIELD OF THE INVENTION

The present invention relates to the field of managing the development of a multi-user accessible database. More particularly, the invention relates to a method for controlling database modifications made to a database object structure or content, where the database is accessible by multiple developers, in order to preserve the database integrity.

BACKGROUND OF THE INVENTION

Databases are computerized information storage and retrieval systems. In computing, databases are sometimes classified according to their organizational approach. The most prevalent approach is the relational database, which is a collection of data items organized as a set of formally-described tables from which data can be accessed or reassembled in many different ways without having to reorganize the database tables. The databases may be stored on direct access storage devices such as magnetic or optical disk drives for semi-permanent storage, or on hard disks connected to a server for direct connection. Computer databases typically contain aggregations of data records or files, such as sales transactions, product catalogs and inventories, and customer profiles.

A database system may be developed by multiple developers, meaning that multiple users may access the database and modify its structure or any one of its objects. However, the simultaneous access of a database by multiple users can give rise to data corruption, that is, the inadvertent over-writing or modification of one user's data by another user. For instance, one user may modify an object of the database and save it, over-writing the modifications of another user. A database integrity scheme is required to avoid data or structure corruption due to simultaneous database modifications by multiple users, in which the multiple users may access and modify the database. In addition, a method is needed for documenting the database modifications done by the users in order to keep track of the modifications, and in order to allow the possibility of restaging the system to one of its former arrangements in case of a faulty modification, otherwise known in the art as the process of "rolling back".

One approach used today by companies in order to solve the documenting problem is to document the database modifications manually. Using manual documentation enables the users to generate a document for listing all the modifications done in the database. Each change is tagged with its details; specifically, when was the change done, who did the change, and general information about the change, in order to track the changes applied to the database at any given time. However, in order to overcome the problem of contradicting simultaneous modifications, a user must verify that no other user is modifying the same resource at the same time, a task which may be done either by sending an email to every database user in the company or by blocking the database connections entirely to all other users for preventing multiple database access and usage. However, Manual documentation of changes applied to the database is prone to mistakes. Using a manual documentation, in order to rollback a database version, is tedious and complicated. Furthermore, since no management, monitoring or control process is performed over the changes applied to the central database for validating consistency, the central database integrity may be comprised.

Another approach used today for documentation involves documenting the database entities creation script in Microsoft Visual Source Safe, known as MS VSS. Using this approach enables the users to generate a document containing the creation codes of the database entities at a given time. Each change is tagged with its details, mainly, when was the change done and who did the change. The database object entity creation code is managed by MS VSS. However, documenting the database entities creation script in MS VSS requires the user to convert the creation code, which was saved in a file, to a database entity in order to trace database changes. Applying this approach takes considerable conversion time and requires purchase of an additional database migration tool. Furthermore, since the MS VSS does not lock the database entities, parallel modifications can be committed on the same database by different users at the same time, often overriding each other's modifications.

U.S. Pat. No. 6,393,419 discloses a synchronization protocol which allows multiple users to simultaneously access and edit a database while ensuring the integrity of data within the database. A database manager, which may be configured as part of the database software application, keeps track of modifications saved to a database file and increments a modification change counter accordingly. When a user accesses a database record, the database manager detects the modification and changes the counter value accordingly. Then, if that client seeks to save modifications to the database record, the database manager detects the current modification change counter value to discern whether other users have saved modifications to the same record following the access by the user presently seeking to save modifications. If the modification change counter has incremented, the user is denied authorization to save the modifications and the user is offered a choice of alternative operations. Nevertheless, the disclosed method solution is only relevant for users of a shared database during runtime, not developers of a database modifying the database during design-time. Furthermore, the disclosed method only prevents a user from saving his modification after spending time and effort in case of conflicting modifications; it does not prevent multiple users from working on the same record and thus waste time on contradicting modifications which may be rejected.

It is an object of the present invention to provide a system capable of managing the database resource availability during the development stage in a multi user environment.

It is another object of the present invention to provide a system for managing the database resource availability during the development stage where modifications are made to a database object structure or content.

It is still another object of the present invention to provide a system that prevents users from simultaneously modifying the same objects.

It is still another object of the present invention to provide a system that automatically documents database modifications.

It is still another object of the present invention to provide a system which prevents unauthorized users from accessing or modifying database objects.

Other objects and advantages of the invention will become apparent as the description proceeds.

SUMMARY OF THE INVENTION

The present invention relates to a method for preventing the simultaneous modification of the same database object in a shared database by more than one user during the database development stage comprising the steps of: (a) creating security roles for said users, wherein each of the security roles has a modification permission set for denying or granting at least one modification permission to at least one said database object; (b) assigning each of said security roles to each of said users; (c) providing means for said users to request said modification permission to said database object; (d) receiving said request from a first user for said modification permission to said at least one database object; (e) determining that said security roles of said users, excluding the security role of first user, are set to deny said modification permissions to said object; (f) updating said security role of said first user to grant said modification permission to said object; (g) allowing said first user to modify said object; (h) receiving a termination notification from said first user for concluding said modification permission to said object; and (i) updating said security role of said first user to cease said modification permission to said object.

Preferably, the first user is allowed to modify the object in the shared database.

Preferably, the first user is allowed to modify the object in a cloned database which corresponds to the object of the shared database.

Preferably, the object of the cloned database is updated to correspond to the object of the shared database prior to allowing the first user to modify said object of said cloned database.

Preferably, the object of the shared database is updated with the first user's modifications after receiving a termination notification from said first user.

Preferably, the means for requesting modification permission to a database object is a software program installed on the computer of the user.

Preferably, the means for requesting modification permission to a database object is an extension installed on the IDE of the user.

Preferably, the users are notified that the object has been modified after the first user has modified the object and sent a termination notification.

Preferably, the first user is notified of the database object's dependencies after the first user's request to modify said object.

The present invention also relates to a simultaneous modification of the same database object by more than one user during the database development stage comprising the steps of: (a) providing a DDL trigger, which automatically executes in response to a DDL event; (b) providing a list of said users for said DDL trigger, for listing which of said users is granted a modification permission for which of said database objects; (c) providing means for said users to request a modification permission to said database object; (d) receiving said request from a first user for modification permission to said database object; (e) determining that said database object modification permission has not been granted to a second user; (f) marking, in said list, that said first user has been granted modification permission of said database object; (g) allowing said user to modify said object by permitting commit execution on the DB object modifications; (h) blocking other users, excluding the first user, from performing modifications by performing a "roll back" action when users perform modifications on said database object; (i) receiving a termination notification from first user for concluding said modification permission to said object; and (j) updating said list by dropping said first user from the users' permission list of that object.

The present invention also relates to a method for preventing the simultaneous modification of the same database object in a shared database by more than one user during the database development stage comprising the steps of: (a) setting said database security tables or other relevant resources to deny modification permissions from all said users; (b) providing means for said users to request said modification permission to said at least one database object; (c) receiving said request from a first user for a modification permission to said at least one database object; (d) determining that said modification permission to said database object has not been granted to a second user; (e) updating said security tables or other relevant resources to grant said modification permission of said database object to said first user; (f) allowing said first user to modify said object; (g) receiving a termination notification from first user for concluding said modification permission to said object; and (h) updating said security tables or other relevant resources to cease said modification permission of said database object to said first user.

DETAILED DESCRIPTION OF PREFERRED EMBODIMENTS

Figure 1:
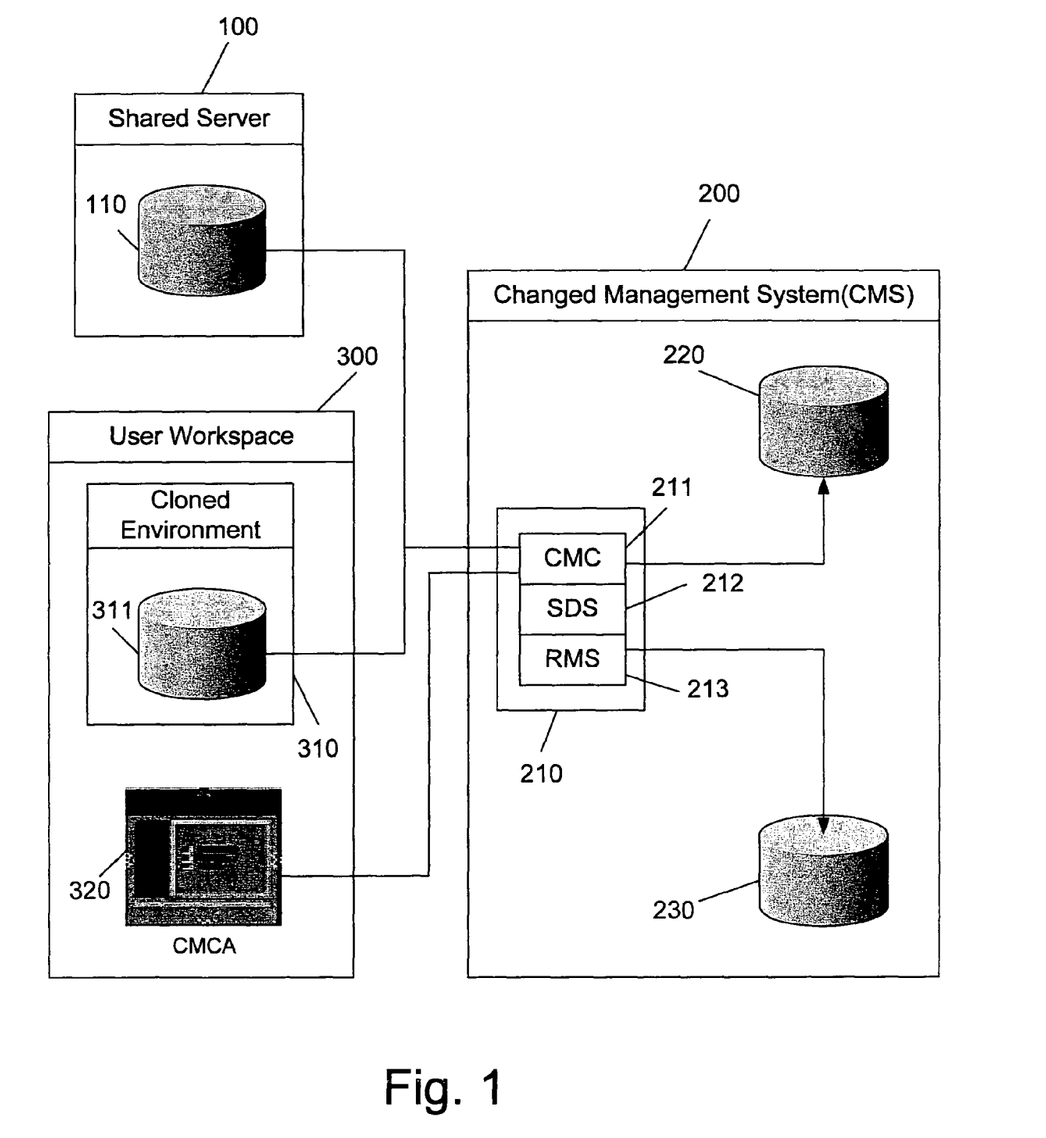
FIG. 1 is a schematic block diagram of the system according to an embodiment of the invention.

FIG. 1 is a schematic block diagram of the system according to an embodiment of the invention. Block 100 is a shared server housing the shared database 110. Database 110 is a rational database being developed by multiple developers, referred to hereinafter as users, each having access and modification permissions. In the present context, the term modification includes the acts of editing, deleting, adding, or in any way altering the database objects structure or contents. For the sake of brevity the following description deals with one database and one connected user, although as understood, other users are presently connected to the database, each capable of accessing the database and having modification permissions. In addition, the method may be implemented on a number of databases residing on the same server 100, on a number of databases residing on a number of servers, or any other computational entity, as well. At first, the Change Management System (CMS) 200 is installed on any connected computational resource capable of performing the following management tasks. Once installed, the CMS 200 is configured to manage and monitor database 110 users' modification requests and control their access privileges. The CMS 200 comprises: a main computing logic 210 and two connecting repositories 220 and 230. Although both repositories 220 and 230 may be implemented as a single repository, for the sake of brevity the following description refers to two different sets of data stored in two different repositories. The main computing logic 210 comprises 3 interrelating computational entities: a Change Management Controller (CMC) 211, a Security Discovery Service (SDS) 212, and a Resource Management Service (RMS) 213. Changed Management repository 220 is used for storing concurrent information on objects of the database 110, mainly database access privileges and permissions, whereas repository 230 is used for documenting and storing previous versions of database objects before modifications are applied to the database 110. Each of the connected users, wishing to access and modify database 110, is required to install on his workspace 300 a Change Management Controller Agent (CMCA) 320, or any kind of agent capable of connecting to the CMS 200 and transferring requests, such as an extension installed on the IDE (Integrated Development Environment) of the user. According to one of the embodiments, the CMS 200 generates a clone database 311 on the user's workspace 300, cloned from database 110, implemented on a cloned workspace 310, similar to the workspace of database 110 in server 100. The CMCA 320 is used by the user for requesting modification access to database 110. In order to commit modifications to database 110, the user must send the request by the agents such as CMCA 320, to CMC 211.

Figure 2:
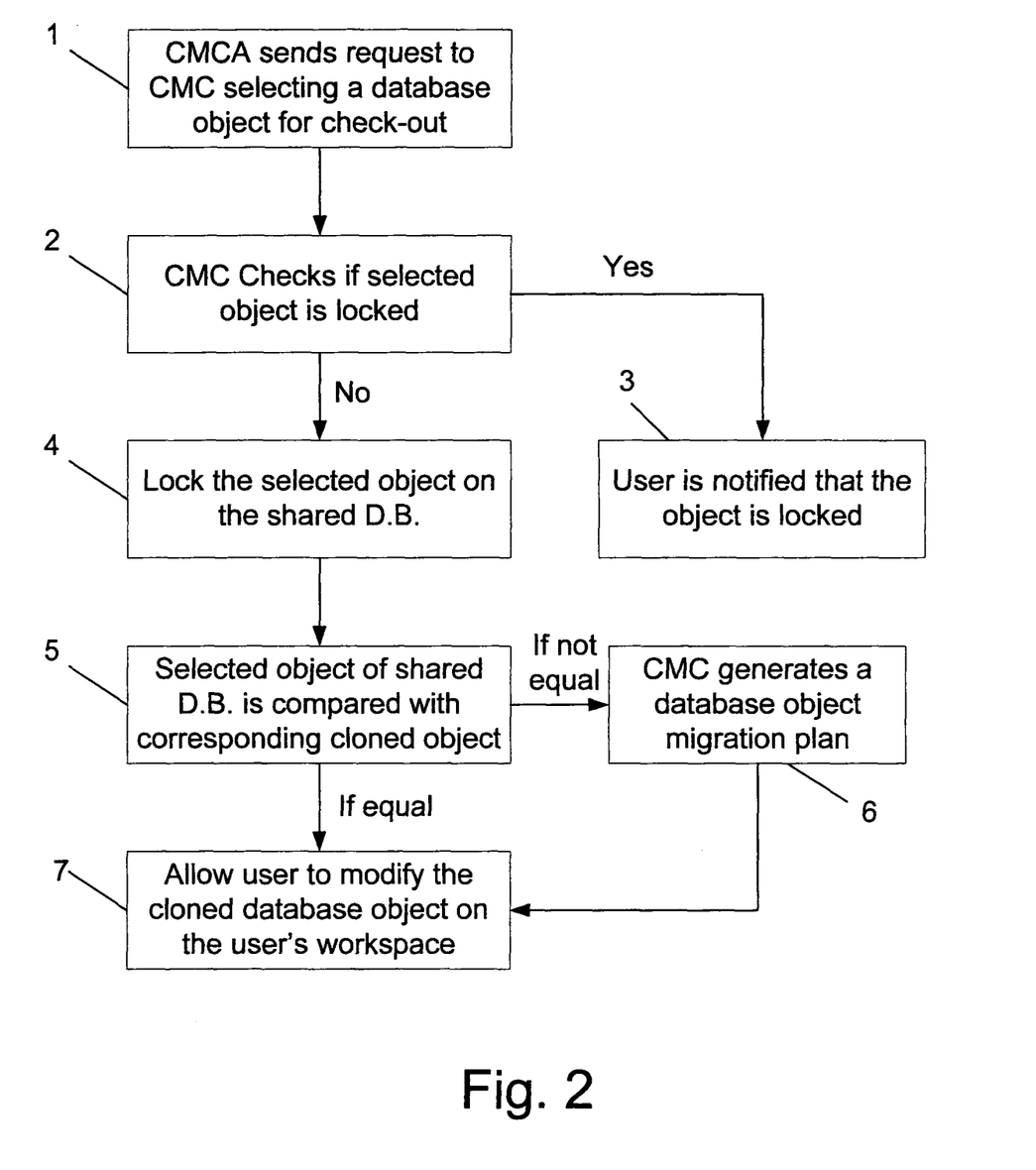
FIG. 2 is a flow chart generally illustrating the first part of the method for providing a user with permission to modify the database object structure or contents, otherwise referred to as the process of "checking out", according to an embodiment of the invention.

FIG. 2 is a flow chart generally illustrating the first part of the method for providing a user with permission to modify the database object structure or contents, otherwise referred to as the process of "check out", according to an embodiment of the invention. In step 1, the user, wishing to modify the structure of a database object or its content, sends a request using his CMCA 320 installed on his workspace 300, as described in relation to FIG. 1. The request, for modifying a database object is sent from CMCA 320 to CMC 211, of the CMS 200, which manages and monitors the access permissions. In step 2, the CMC 211 retrieves information from the repository 220, for determining whether the requested object is "exclusively locked" by another user, meaning that the selected object has been requested by another user and marked in the repository as "checked out" by this other user. The locking mechanism which is the essence of the invention will be described later on in relation to FIG. 6 and the consecutive paragraphs. If the selected object is "Exclusively locked" by another user, user is notified that he may not modify the selected object in step 3. Nevertheless, according to one of the embodiments, the user may view the requested object of the cloned database on his local workspace without modifying permissions. However, if the selected object is not "Exclusively locked" by another user, then, in step 4, the CMC 211 changes its status to "checked out" by the requesting user in the repository 220. As understood, the locking mechanism is monitored using a flag or a tag signaling that the object is being modified at the moment, and therefore no other user may be allowed to modify it when the flag is signaled. In step 5, the CMC 211 compares the selected object of the cloned database 311 with its corresponding object in the shared database 110, mainly by comparing the properties and attributes of the database objects having the same name in both servers. If the corresponding objects do not match then, in step 6, the CMC 211 generates and executes a database object migration plan from the shared monitored database 110 to the user's cloned database 311, in order to match the selected object in the user's cloned database 311 to correspond with its counterpart object of the shared database 110. The database migration plan process will be described further in relation to FIG. 5. Once the selected object and its cloned object are identical, the CMC 211, in step 7, grants the user, who sent the request to modify the object, an alter object permission on his cloned database 311. In other words, at this point, the user is allowed to modify the requested object residing in his workspace 300.

Figure 3:
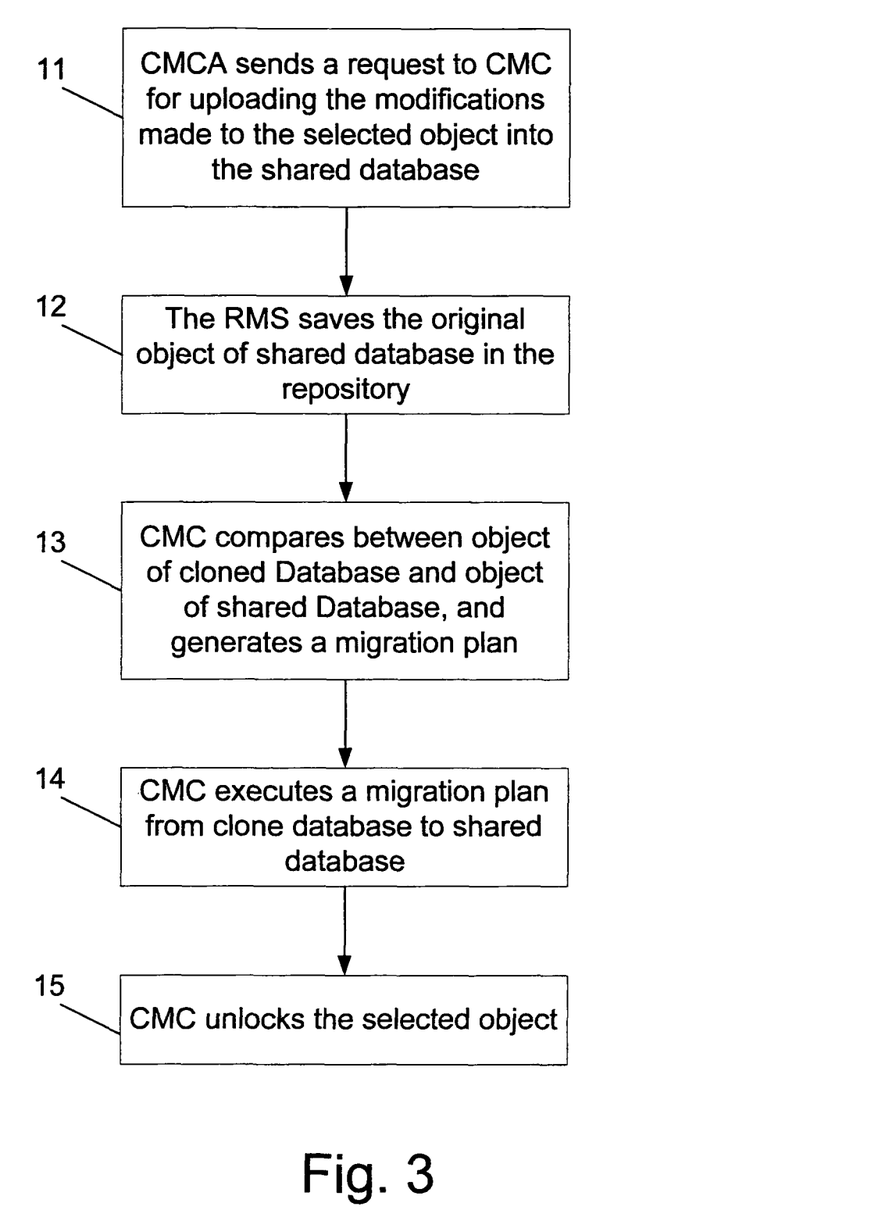
FIG. 3 is a flow chart generally illustrating the second part of the method for modifying the shared database object structure or contents, otherwise referred to as "check-in", according to an embodiment of the invention.

FIG. 3 is a flow chart generally illustrating the second part of the method for modifying the shared database object structure or contents, otherwise referred to as "check-in", according to an embodiment of the invention. In step 11, the user, wishing to upload his modified object residing in his workspace 300 to the shared database 110, sends a request using his CMCA 320 installed on his workspace 300, as described in relation to FIG. 1. The request, for uploading the modified database object, is sent from CMCA 320 to CMC 211 of the CMS 200, which manages and monitors the database modifications. The CMC 211 sends a request to the RMS 213 to store the corresponding object residing in the shared monitored database 110, referred to hereinafter as prior object, in the repository 230 for archiving the prior version of the object. In step 12, the RMS analyzes the request and stores the prior object in the repository 230. In step 13 the CMC 211 compares the modified object of the cloned database 311 residing in user's user isolated workspace 300 with the prior object and generates a migration plan for modifying the prior object to its modified version residing in cloned database 311. The database migration plan process will be described further in relation to FIG. 5. In step 14 the CMC 211 executes the generated migration plan on the shared database 110, for applying the object modifications, made by the user in his isolated workspace 300. In step 15, CMC 211 changes the status of the modified object to "checked-in" in the repository 220, thus allowing any other user to "check out" the object.

For the sake of brevity the above description deals with a user's modification request for only one object. However, as understood, the user may request modification permissions to a number of objects, especially when some of the objects are dependant on other objects, in which case the method described above of checking out and checking in is applied for all the requested objects.

Figure 4:
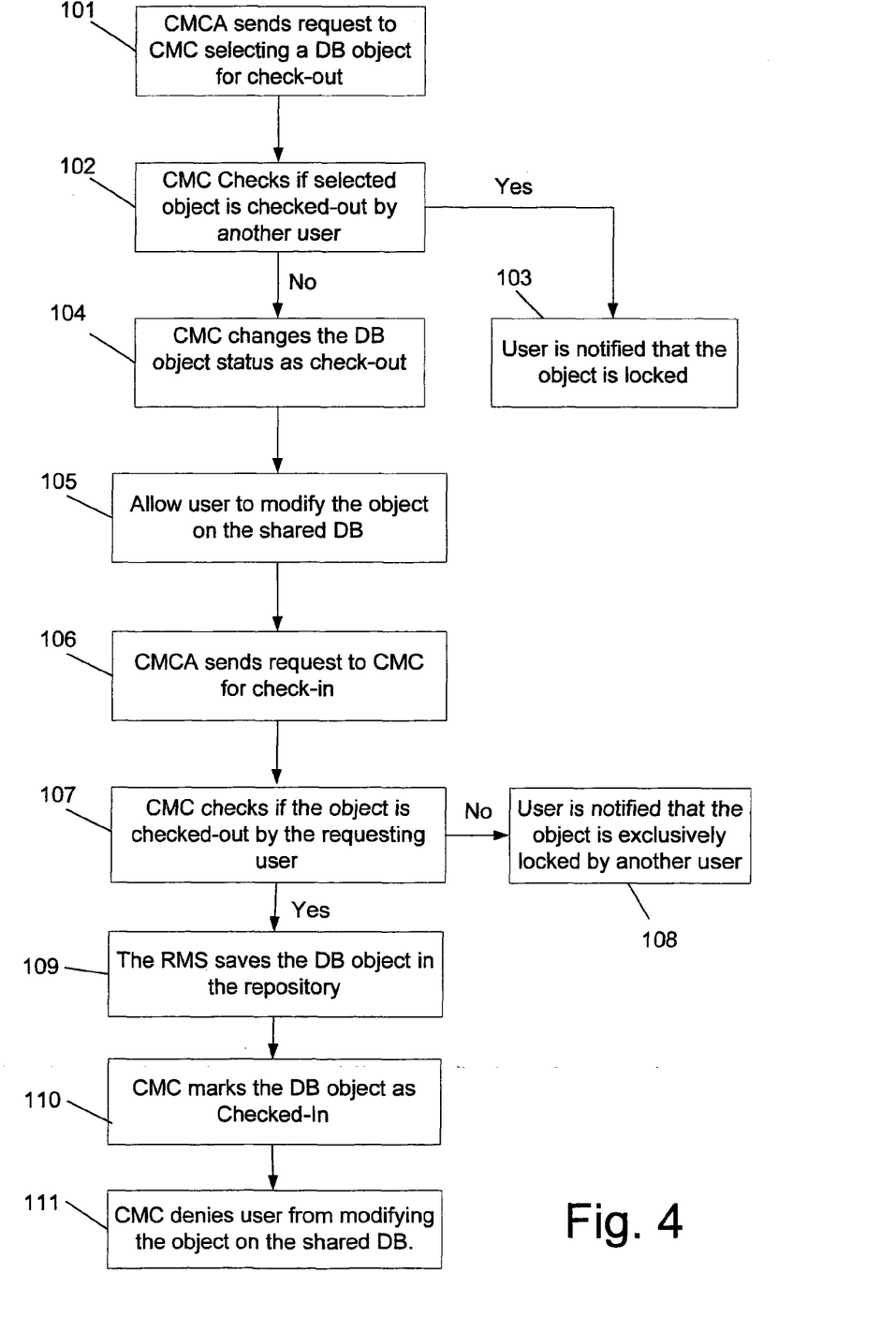
FIG. 4 is a flow chart generally illustrating the method for providing a user with permission to modify a database object structure or contents on the shared database according to another embodiment of the invention.

FIG. 4 is a flow chart generally illustrating the method for providing a user with permission to modify a database object structure or contents on the shared database according to another embodiment of the invention. In this embodiment the users do not need a cloned database on their user's workspace, as the modifications are applied exclusively on the shared database itself. In step 101, the user, wishing to modify the structure of an object of the shared database or its contents, sends a request using his CMCA 320 installed on his workspace 300, as described in relation to FIG. 1. The request, for modifying a database object is sent from CMCA 320 to CMC 211, of the CMS 200, which manages and monitors the access permissions. In step 102, the CMC 211 retrieves information from the repository 220, for determining whether the requested object is "Exclusively locked" by another user, meaning that the selected object has been "checked out" by another user. If the selected object is "Exclusively locked" by another user, the user is notified that he may not modify the selected object in step 103. However, if the selected object is not "Exclusively locked" by another user, then, in step 104, the CMC 211 changes its status to "checked out" by the requesting user in the repository 220, and therefore no other user may be allowed to modify it during this time. In step 105, the RMS saves a copy of the shared database 110 requested object in the repository 230. In step 106 the user is allowed to modify the requested object itself in the shared database 110. When the user finishes modifying the selected object, he sends a request form from CMCA 320 to CMC 211 "for check in". In step 107, CMC 211 checks if the requested object has in fact been "checked out" by the requesting user. If not then in step 108 the user is notified that the selected object is "Exclusively locked" by another user and the user is notified that he may not check in the selected object. If yes, then in step 109 the RMS saves the database object in the repository. In step 110, the CMC 211 marks the database object as "checked in", and in step 111 CMC 211 denies the user from modifying the object on the shared database 110, effectively allowing other users to request a check out action and modify the object.

Figure 5:
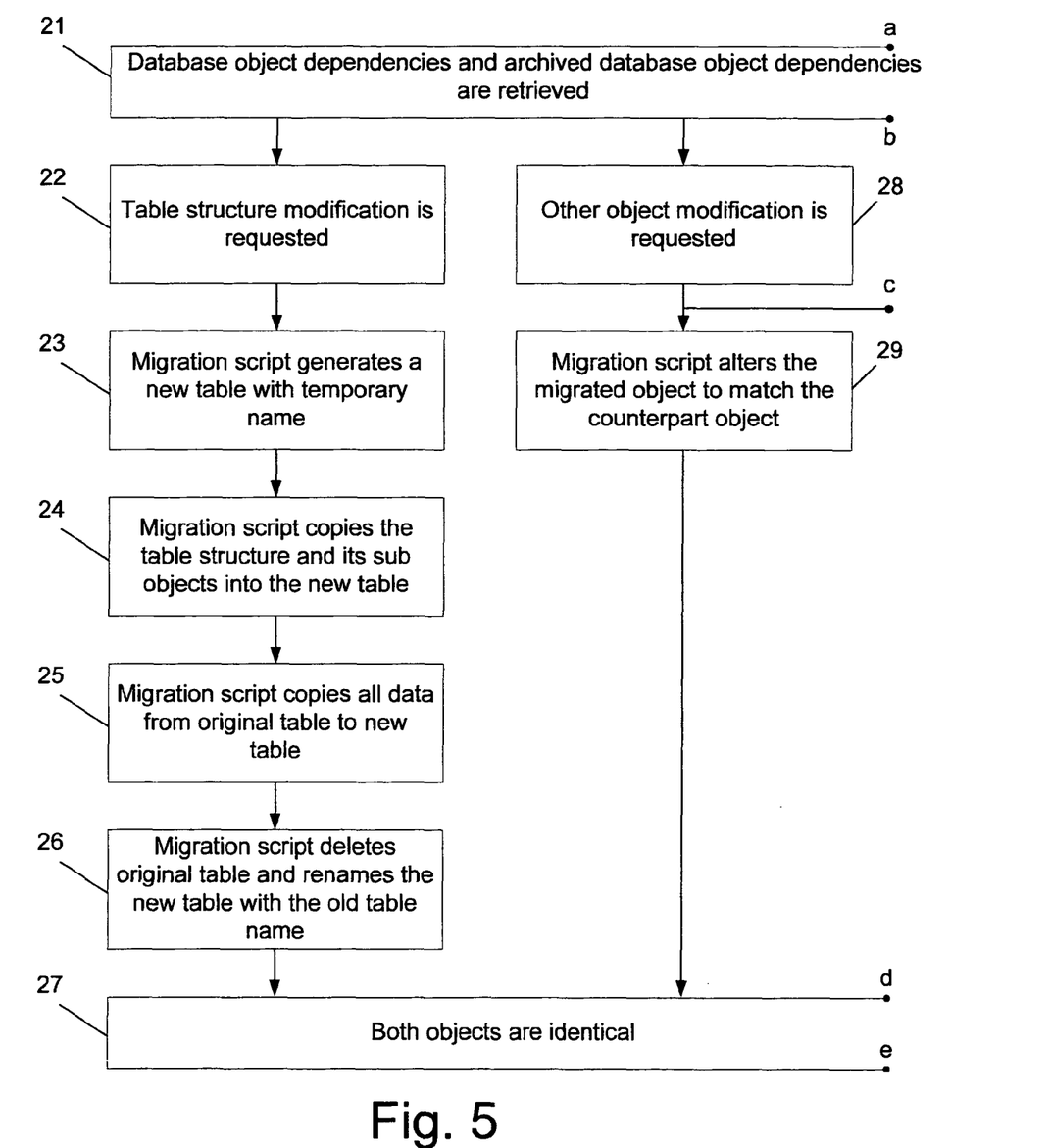
FIG. 5 is a flow chart generally illustrating the method of the migration plan process according to one of the embodiments.

FIG. 5 is a flow chart generally illustrating the method of the migration plan process according to one of the embodiments. As described before, the migration plan process is used in order to match an object in the cloned database to its corresponding counterpart object in the shared database, or vise versa to match an object in the shared database to its corresponding modified counterpart object in the cloned database. In step 21 the database object dependencies of the selected object is retrieved together with the archived database object dependencies in order to know in which order to generate the migrated objects. For the sake of brevity the following description deals with the migration plan of only one object, although, as understood, the migration plan may deal with a plurality of modified objects. The modification of the selected object, as requested by the user of the migration plan, may belong to 1 of 3 kinds: (a) modification of a table structure; (b) other kinds of object scheme modifications; (c) modification of table/view contents. If the selected modification belongs to the first kind, i.e. the modification of a table structure then in step 22, a table structure modification is requested. In step 23, a migration script is created which generates, using DDL actions, a new table with a temporary name. In step 24, the migration script copies the selected table structure and all its sub objects, such as indexes, foreign keys, primary key, and constraints, into the new created table. In step 25 the migration script continues copying all data from the original table to the new created table using SQL DML commands. In step 26, the migration script deletes the original table and renames the new created table with the name of the deleted original table. Thus the newly created table is identical to the source table. In case the request for modification belongs to second kind of modification, i.e. the modification of other objects scheme, then in step 28, an object scheme modification is requested. In step 29, the alteration is done by executing the generated migration script SQL action which alters the selected database object directly. In step 30 the alteration is done by executing the generated migration script action which deletes the selected database object. In step 31 the migration script recreates the selected database object. In any case the altered object should be identical to the source object. In case the request for modification belongs to third kind of modification, i.e. the modification of table/view contents, then in step 32, table/view modification is requested. In step 33 a comparison is done between the two tables or views in order to generate a migration script composed of DML actions. In step 34 the migration script inserts, updates and deletes records from the original table based to the comparison results. In step 27 both objects, the source and destination, are identical. According to an embodiment of the invention, the Security Discovery Service (SDS) 212, as described in relation to FIG. 1, executes a scheduled scan over the shared database 110 security sources in order to identify any new database security principals, mainly new connected users. This process identifies and blocks any unmonitored database modification attempts. Examples of such security sources may be: Active Directory users and groups, local system users and Groups, and Database SQL users. SDS 212 actively monitors all sources of database security privileges, both at the server 100 and at the database 110. This monitoring enables the SDS 212 to identify any database security related changes. According to one of the embodiments, when the SDS 212 identifies a new user in the organization security schema, it blocks the user from performing modifications on the database objects by sending a request to the CMC 211 to change the user's ability to change the database objects. The CMC 211 denies the user's modification permissions, until a formal request from the user's CMCA 320 is received. In this way the CMS 200 prevents any new user from modifying any of the database objects without a proper request. In one of the embodiments SDS 212 changes the user's ability to change the database objects, without sending the request to CMC 211. In addition SDS 212 also reads the database object list and monitors any new database objects. When SDS 212 identifies a new object, it blocks all database users from modifying the object by denying their object modification permission.

In one of the embodiments the SDS 212 has direct connection to the repository 220, and shared database 110 in relation to FIG. 1. Therefore, when a new object or user is detected, SDS 212 changes the user's ability to change the database by changing the permission list on the shared database 110 and changing the object's status in repository 220 directly.

According to one of the embodiments, when the database objects are identified by the SDS 212, in relation to FIG. 1, the database objects status is set to "Pre Checked" in the repository 220 by SDS 212. Meaning, that the user must set the object status to "checked in" in repository 220 in order to make the object available for check out. In another embodiment when the database objects are identified by the SDS 212, the database objects status is set to "checked in" in the repository 220, and the database object is available for checking out.

Figure 6:
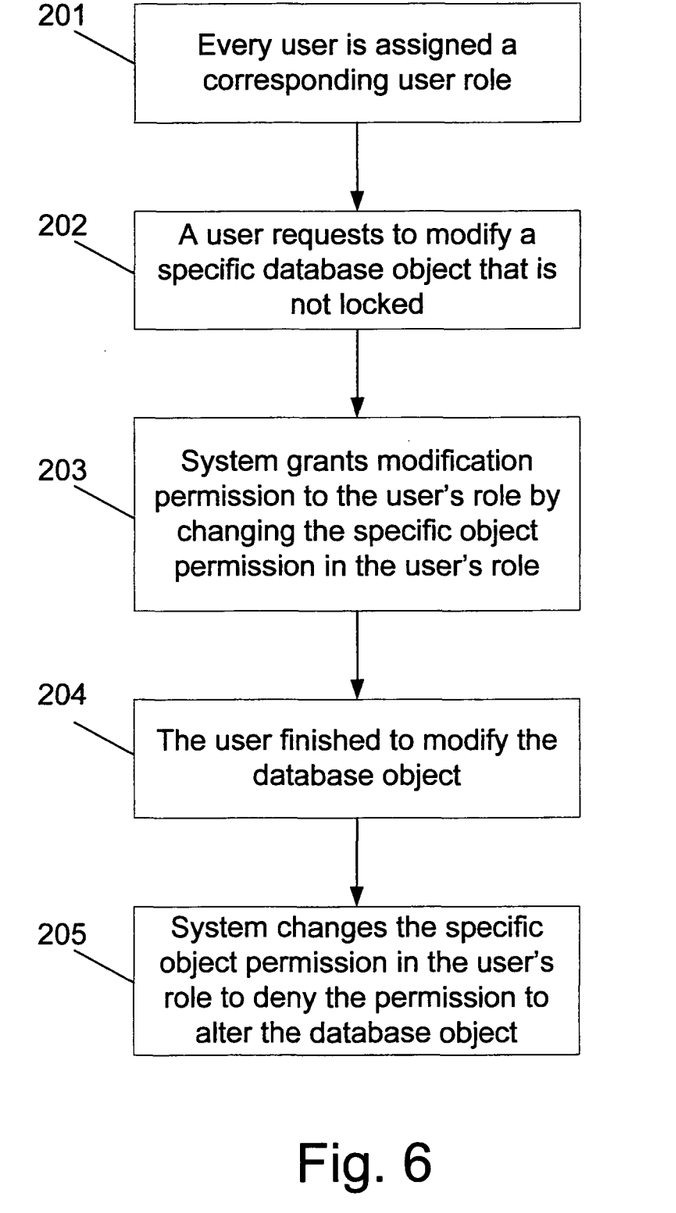
FIG. 6 is a flow chart generally illustrating the method of the locking mechanism according to one of the embodiments.

FIG. 6 is a flow chart generally illustrating the method of the locking mechanism according to one of the embodiments. In this embodiment the system generates a designated security role for each database user, where each user is assigned his corresponding role. The security role is generated in order to supply a security control layer over the existing configured basic security layer of the database. As known in the art, the basic database security layer defines each user's permissions to modify or access database objects. Alas, in this embodiment, another security control layer is added where each listed user has a corresponding security role, for controlling the modification permissions of the users. These security roles are managed by the locking mechanism in order to deny or grant modification permissions of the users. When the SDS 212, as illustrated in relation to FIG. 1, identifies a new object in the database it changes the permission set of all users' security roles to deny modifications to the object. Once all the security roles are updated, the only way for a user to modify the object is through a proper request for modification. In step 201, every user is assigned a corresponding security role with a permission set. At first the permission set for all users is set to deny all modifications. In step 202 one of the users sends a request to modify a specific database object. The request is handled by the locking mechanism which checks if the selected object has been requested previously by a different user. Once the locking mechanism has determined that no other user is modifying the same object, i.e. the object is not "exclusively locked"; the requesting user's role is changed to grant the user's modification permission for that specific object in step 203. At this stage the user may access and modify the requested object, according to his original access and modify permissions defined in the basic security layer. Any attempt made by a different user to modify the same object or to request modification access is blocked by the locking mechanism which utilizes that user's corresponding security role. In step 204, when the user finishes modifying the requested database object, he notifies the locking mechanism. In step 205 the locking mechanism in turn changes the user's security role to deny the user modification permission on the modified object. Thus at this point any other user may request to modify the object. In addition all the other users are notified that the object has been modified.

Although for the sake of brevity the above description deals with one requested object, the method of the invention may be carried out with a number of database objects requested by the same user. Furthermore, during the modification of a first object by a first user, a second user may be allowed to modify a second object using the same method described above. Thus the method of the invention may be used by many users modifying many database objects simultaneously without comprising the database integrity.

In a different embodiment the locking mechanism is imposed by a Data Definition Language (DDL) trigger, which automatically executes in response to a database DDL event. In this embodiment the DDL trigger is used as a security control layer in addition to the security layer of the database. Thus, any unauthorized attempt to modify a database object is blocked by performing a "roll back" action on the requested changes. In this embodiment the database users' permissions and security layer are not changed. However, the DDL trigger owns a list of users who are allowed to modify specific objects. Thus, each unauthorized modification sent by a user which does not belong to the DDL permitted user list for database object is blocked by the DDL trigger. In this embodiment the term "roll back" is used for describing how the DDL triggers handles an unauthorized DDL transaction, meaning that a user may have modification permissions on the requested object in the database security layer, however, the DDL trigger is sure to "roll back" all the changes effectively restoring the object to its former state. Thus the system receives the object in its original state. When a user sends a request for modifying a specific database object the DDL trigger checks in his list if modification access has been granted to a different user, i.e. "exclusively locked" by another user. If the specific object has not been locked, the locking mechanism marks it as being exclusively locked by that user and the DDL trigger allows the requesting user to modify the object by permitting commit execution on the DB object modifications. Any attempt sent by a different user to modify the same specific object is blocked and rolled back. Only after the first requesting user notifies the system that he has finished modifying the object, the list is updated and the user is dropped from the users' permission list of that object.

In yet another embodiment, the locking mechanism is carried out by controlling the database security setting tables or other relevant resources directly. In this embodiment the database security tables are set to deny modification permissions from the users. When a user requests to modify an object, the locking mechanism checks that no other user has been granted modification permission, i.e. "exclusively locked" by another user. If the specific object has not been locked, the locking mechanism changes the modification permission of the specific object to grant the requesting user modification permission. At this point no other user may be granted modification permission for that specific object. When the requesting user notifies the system that he has finished modifying the object, the database security tables or other relevant resources are updated and the user modification permission is modified to disallow any more modifications, effectively allowing other users to send a request and modify that specific object.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for enforcing check-in and check-out policies in a database and automatically preventing out of process or simultaneous modification of a same database object in a shared database by more than one user during a database development stage comprising the steps of:
   a. providing one or more Data Definition Language (DDL) triggers to impose said enforcement of the check-in and check out policies and drive updates for each structural object of said database, which automatically execute in response to a DDL event, during any attempt to modify said database structural object;
   b. providing means for the users to request a modification permission to said database structural object by performing a check-out attempt;
   c. receiving a request from a user for modification permission with respect to a selected database structural object;
   d. automatically determining that the database object modification permission has not been granted to a second user who performed a check-out action but has not performed a check-in action yet and performing a check-out action to allow said user to modify said selected object causing a DDL event to commence automatically initiating a locking condition, using said one or more DDL triggers, with respect to said selected object by a control layer of said database upon detecting commencement of said event, whereby to block remaining users from performing modifications to said database structural object after imposing for said remaining users;
   e. a check-in action to thereby receive a termination notification for concluding the modification permission to said selected object, wherein said locking condition continues as long as said user has not concluded a modification operation; and
   f. upon conclusion of said modification operation, terminating said locking condition to enable one of said remaining users to perform a check-out action with respect to said selected object.

2. A method for enforcing check-in and cheek-out policies in a database and automatically preventing out of process or simultaneous modification of a same database object in a shared database by more than one user during a database development stage comprising the steps of:
   a. setting database objects access lists to deny modification permissions from all users;
   b. providing means for said users to request modification permission to a database structural object by performing a check-out attempt;
   c. automatically receiving the request from a first user for a modification permission to a selected database structural object;
   d. automatically determining that the modification permission to the database structural object has not been granted to a second user who performed a check-out action, but has not yet performed a check-in action;
   e. automatically updating the database access lists to grant the modification permission of the database object only to the first user;
   f. allowing the first user to modify the structural object while blocking, by a control layer of said database, any attempt sent by a different user to modify said object or to restore said object to a former state;

g. allowing the first user to perform a check-in action, to thereby receive a termination notification for concluding the modification permission to said structural object; and h. automatically updating the database access lists to cease the modification permission of said structural object to the first user;

wherein each listed user has a corresponding security role, for controlling the modification permissions of the users.

* * * * *